United States Patent
Ueno et al.

(10) Patent No.: US 7,567,825 B2
(45) Date of Patent: Jul. 28, 2009

(54) RECEIVING APPARATUS, COMMUNICATION APPARATUS, TERMINAL APPARATUS, COMMUNICATION TERMINAL APPARATUS, RECEIVING METHOD, RECEIVING PROGRAM, AND COMPUTER-READABLE RECORDING MEDIUM STORING RECEIVING PROGRAM

(75) Inventors: Tetsuo Ueno, Funabashi (JP); Shigetaka Noguchi, Nagareyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 129 days.

(21) Appl. No.: 10/586,672

(22) PCT Filed: Jan. 21, 2005

(86) PCT No.: PCT/JP2005/000753

§ 371 (c)(1),
(2), (4) Date: Mar. 26, 2007

(87) PCT Pub. No.: WO2005/071859

PCT Pub. Date: Aug. 4, 2005

(65) Prior Publication Data

US 2007/0264962 A1 Nov. 15, 2007

(30) Foreign Application Priority Data

Jan. 23, 2004 (JP) .............................. 2004-016351
Jul. 1, 2004 (JP) .............................. 2004-196010

(51) Int. Cl.
*H04B 1/38* (2006.01)
*H04B 1/16* (2006.01)
*H04M 1/00* (2006.01)

(52) U.S. Cl. .................. 455/574; 455/343.2

(58) Field of Classification Search ................. 455/574, 455/343.1, 343.2; 340/7.32, 7.33; 375/130; 370/311
See application file for complete search history.

(56) References Cited

U.S. PATENT DOCUMENTS

| 5,802,101 | A | 9/1998 | Maruyama |
| 2004/0218699 | A1* | 11/2004 | Carsello ................... 375/343 |

FOREIGN PATENT DOCUMENTS

| JP | 08-307428 |   | 11/1996 |
| JP | 10-190564 | A | 7/1998 |
| JP | 2003-133997 | A | 5/2003 |
| JP | 2003-333638 |   | 11/2003 |

* cited by examiner

*Primary Examiner*—Nguyen Vo
(74) *Attorney, Agent, or Firm*—Birch, Stewart, Kolasch & Birch, LLP

(57) ABSTRACT

A wireless communication apparatus receives an external signal, and includes (i) a received signal level determination section for detecting a power level of the received signal and (ii) a correlation detection/determination section for detecting a correlation associated with the received signal. Moreover, the wireless communication apparatus switches between reception standby states as required, the reception standby states, including: (a) a normal operation mode in which a shift to a reception state is determined in accordance with whether or not the correlation is detected by the correlation detection/determination section; and (b) a low power consumption mode in which the shift to the reception state is determined in accordance with whether or not a received signal power level is detected by the received signal level determination section. With this, power consumption can be reduced, but a range of reception power of a signal that can be received is not narrowed. That is, the power consumption of the communication apparatus can be reduced, and the communication apparatus is allowed to receive a signal whose reception power falls within a wide range.

26 Claims, 8 Drawing Sheets

FIG. 2

| USER INTERFACE | STANDBY MODE SELECTION PROCESS |
|---|---|
| NORMAL STANDBY | NORMAL OPERATION MODE |
| LOW POWER CONSUMPTION STANDBY | LOW POWER CONSUMPTION MODE |
| AUTOMATIC SELECTION | AUTOMATICALLY SELECT EITHER ONE OF NORMAL OPERATION MODE AND LOW POWER CONSUMPTION MODE |

RECEIVING APPARATUS, COMMUNICATION APPARATUS, TERMINAL APPARATUS, COMMUNICATION TERMINAL APPARATUS, RECEIVING METHOD, RECEIVING PROGRAM, AND COMPUTER-READABLE RECORDING MEDIUM STORING RECEIVING PROGRAM

TECHNICAL FIELD

The present invention relates to a technique for managing power consumption of a communication apparatus. Particularly, the present invention relates to a technique for managing power consumption in a wireless LAN using a direct-sequence spread spectrum technique.

BACKGROUND ART

High-speed communications technologies have developed remarkably. Particularly, a communication method using a spread spectrum wireless signal has been widely used in the field of data communication and mobile communication so as to allow for (i) efficient use of radio waves and (ii) noise resistance.

Since a general wireless LAN apparatus serves as a wireless terminal, there has been a demand for miniaturization and portability of the wireless LAN apparatus. Therefore, the wireless LAN apparatus needs to be driven by a battery or the like, and is expected to operate with low power consumption. Normally, when a reverse spread signal reaches a certain level or higher during a reception standby state, the wireless LAN apparatus determines to start a reception operation. Then, the wireless LAN apparatus switches from the reception standby state to a reception state so as to start the reception operation. On the other hand, in response to a transmission request sent from a terminal, the wireless LAN apparatus confirms that no other terminals are carrying out transmission, and then starts transmission. During the reception, the wireless LAN apparatus needs to operate a large number of flip-flop circuits such as a shift register for the purpose of, for example, (i) despreading spread spectrum data, (ii) detecting amplitude per symbol, and (iii) operating an integrating circuit in a synchronization process. Therefore, the wireless LAN apparatus consumes a large amount of power during the reception. Further, even in the reception standby state, the wireless LAN apparatus needs to operate its RF section, its reverse spread demodulation section, its amplitude detection section, and the like for the purpose of detecting the level of the reverse spread signal. Therefore, the power consumption cannot be greatly reduced even in the reception standby state. Thus, although the wireless LAN apparatus is in the reception standby state for most of the time, most of its circuits are always operated. Therefore, the wireless LAN apparatus consumes as much power in the reception standby state as it does during the reception, i.e., wastes power.

Further, Japanese Unexamined Patent Publication No. 333638/2003 (Tokukai 2003-333638; published on Nov. 21, 2003) discloses cell detection carried out in accordance with a result of a correlation arithmetic process carried out with respect to a received signal with the use of a spread code used at a transmitting end. However, also in this case, even in the reception standby state, it is necessary to supply power to a circuit for carrying out the correlation detection with respect to the received signal. Therefore, the effect of reducing the power consumption is small.

Power supply and clock signal supply to such a reception circuit (digital circuit component) can be stopped in cases where the wireless circuit is provided with means for detecting the received signal in an analog manner. This makes it possible to reduce the power consumption. Generally adopted as the method for detecting the received signal in the analog manner is a method for generating, at an IF stage (intermediate frequency stage), a received signal level signal indicating a received signal level substantially proportional to the reception power. A typical example of the received signal level signal indicating the received signal level is an RSSI (Received Signal Strength Indicator). In accordance with the received signal level signal thus generated, a judgment is carried out whether or not the signal exists at the receiver input. When the signal is detected, it is judged that some sort of signal has been received by an antenna. An A/D converter and the reception circuit provided after the A/D converter are operated only in such a case. In this way, it becomes possible to reduce power that is to be consumed by the A/D converter and the digital circuit component (component constituting the reception circuit in this case).

FIG. 5 is a functional block diagram showing an example of an arrangement of each of a transmitting section and a receiving section of a conventional wireless LAN apparatus proposed based on the idea described above and adopting the direct-sequence spread spectrum technique. (See Japanese Unexamined Patent Publication No. 307428/1996 (Tokukaihei 8-307428; published on Nov. 22, 1996).) The communication apparatus (wireless LAN apparatus) 100 shown in FIG. 5 includes an antenna 102, an RF section 103 of the receiving system, a received signal level determination section 115, a power supply/clock control section 117, an A/D converter 105, a despreading demodulation section 107, an amplitude detection section 111, a synchronization integrating section 121, a synchronization detection section 123, and an information demodulation section 113. The RF section 103 carries out frequency conversion of an RF signal contained in an electric wave picked up by the antenna 102, into a baseband signal. The received signal level determination section 115 makes, by using a comparator provided therein, a comparison between (i) a received signal level signal generated in the RF section 103 and (ii) a threshold value C shown in FIG. 7, and determines whether or not the reception operation is to be started. The power supply/clock control section 117 controls power supply and a clock for each of the blocks. The A/D converter 105 carries out A/D conversion with respect to an output of the RF section 103. The despreading demodulation section 107 reverse-spreads a spread signal. The amplitude detection section 111 calculates an amplitude value of an output of the despreading demodulation section 107. The synchronization integrating section 121 integrates an output of the amplitude detection section 111 per symbol. The synchronization detection section 123 generates a synchronization signal in accordance with an output of the synchronization integrating section 121. The information demodulation section 113 carries out information demodulation by using (a) the output of the amplitude detection section 111 and (b) the synchronization signal sent from the synchronization detection section 123. The information demodulation section 113 supplies an output signal to a terminal apparatus 125. In FIG. 5, the transmitting system is omitted.

The following explains operations of the apparatus shown in FIG. 5. In the reception standby state, only the RF section 103 of the receiving system, the received signal level determination section 115, and the power supply/clock control section 117 are operated (reception standby mode). The power supply/clock control section 117 stops the power from being supplied to an RF section (not shown) of the transmitting system, and stops the operation clock signal from being supplied to the other circuits (i.e., an information modulation section and a spread modulation section (both not shown) of the transmitting system, the A/D converter 105, the despreading demodulation section 107, the amplitude detection section 111, the synchronization integrating section 121, the synchronization detection section 123, and the information demodulation section 113), so that the circuits completely stop operating. Those circuits whose operation is stopped by stopping the supply of the operation clock signal may be arranged such that the operation of the circuits is stopped by stopping the power from being supplied to the circuits.

In such a reception standby mode, the RF section 103 of the receiving system sends a received signal level signal SG101 to the received signal level determination section 115. The received signal level determination section 115 makes, by using the comparator provided therein, a comparison between (i) the received signal level signal SG101 and (ii) the threshold value C which is shown in FIG. 7 and which has been designated, for example, by the terminal apparatus 125. In cases where the received signal level signal SG101 has a value greater than the threshold value C, the received signal level determination section 115 determines to start the reception operation. Then, the power supply/clock control section 117 operates the other circuits necessary for the reception operation (i.e., the A/D converter 105, the despreading demodulation section 107, the amplitude detection section 111, the synchronization integrating section 121, the synchronization detection section 123, and the information demodulation section 113) (reception mode). When the reception operation is finished, the power supply/clock control section 117 causes only the RF section 103 of the receiving system, the received signal level determination section 115, and the power supply/clock control section 117 to be operated (reception standby mode).

The communication apparatus 100 starts transmission in the following manner. That is, upon receiving a transmission request from the terminal apparatus 125, the communication apparatus 100 confirms that the communication apparatus 100 is not carrying out the reception operation, and then starts the transmission by causing the circuits necessary for the transmission (i.e., the information modulation section, the spread modulation section, and the RF section of the transmitting system (all not shown)) to be operated. When the transmission is finished, the power supply/clock control section 117 causes only the RF section 103 of the receiving system, the received signal level determination section 115, and the power supply/clock control section 117 to be operated. By providing such a low power consumption mode, the power consumption can be reduced.

In the wireless apparatus, the received signal level signal normally has a characteristic shown in FIG. 7. In FIG. 7, the horizontal axis represents reception power (received power) available at an end of the antenna, and the vertical axis represents a value of the received signal level signal such as the RSSI. Further, the dotted line L1 represents the minimum value of reception sensitivity, i.e., the weakest reception power of a signal that can be received by the wireless apparatus. Furthermore, the threshold value C is usually set at a value greater than the minimum value of the received signal level signal for the purpose of preventing a malfunction from occurring due to the influence of noise. Therefore, the reception power range represented by R3 of FIG. 7 is a range of the reception power of the signal that can be received. On the other hand, a wireless terminal that starts the reception operation in cases where the received signal level signal has a value not less than the threshold value C starts the reception operation only when the reception power is greater than the reception power indicated by the dotted line L2, which is a vertical line extending down from the intersection of the characteristic graph with the dotted line indicating the threshold value C. Therefore, the range of the reception power of the signal that can be received by the wireless apparatus is the range represented by R2. That is, the range of the reception power of the signal that can be received becomes narrower by R1, i.e., a difference between R3 and R2. Particularly, since the spread spectrum (SS) technique is capable of demodulating even a signal indicating a level substantially equal to that of noise, the difference R1 between R3 and R2 becomes larger. Generally, as the wireless terminal gets further away from a transmitting terminal, the reception power becomes smaller. Therefore, the communication distance is shortened by a distance corresponding to R1, i.e., the difference between the two ranges of the reception power of the signal that can be received by the wireless terminal which starts the reception operation in cases where the received signal level signal has a value not less than the threshold value C, although the wireless terminal allows reduction of power that is to be consumed in the reception standby state. That is, since the conventional wireless LAN apparatus is provided with the low power consumption mode, the range of the reception power of the signal that can be received becomes narrow. This causes such a problem that the communication distance becomes short.

DISCLOSURE OF INVENTION

It is an object of the present invention to (i) reduce power consumption of a communication apparatus and (ii) allows the communication apparatus to receive a signal whose reception power falls within a wide range.

In order to attain the foregoing object, a receiving apparatus of the present invention includes (i) a received signal level determination section for detecting a power level of a received signal and (ii) a correlation detection section for detecting a correlation between the received signal and a predetermined reference signal, the receiving apparatus switching between reception standby states as required, the reception standby states, including: a normal operation mode in which a shift to a reception state is determined in accordance with whether or not the correlation is detected by the correlation detection section; and a low power consumption mode in which the shift to the reception state is determined in accordance with whether or not a received signal power level not less than a predetermined value is detected by the received signal level determination section.

Here, the correlation between the received signal and the predetermined reference signal is used to determine whether or not the received signal is an effective signal. For example, when the correlation between the received signal and the reference signal has a value not less than a certain value, the received signal is deemed to have a correlation with the reference signal, so that it is determined that the received signal is an effective signal.

According to the foregoing arrangement, the reception standby states include the two modes: the normal operation mode and the low power consumption mode. In the low power consumption mode, the shift to the reception state is determined in accordance with whether or not the received signal power level is detected by the received signal level determination section. Therefore, in the low power consumption mode, it is not necessary to detect the correlation between the received signal and the predetermined reference signal, and it is possible to save power for use in driving the correlation detection section. However, in the low power consumption mode, the shift to the reception state is made only when a received signal power level not less than the predetermined value is detected. Therefore, in cases where a received signal power level less than the predetermined value is detected, the reception supposed to be possible in the normal operation mode cannot be carried out in the low power consumption mode.

On the other hand, in the normal operation mode, the shift to the reception state is determined in accordance with whether or not the correlation between the received signal and the predetermined signal is detected. Therefore, although the power for driving the correlation detection section is required, it is possible to receive a signal having such a received signal power level that the signal cannot be received in the low power consumption mode. This allows the receiving apparatus to receive a signal whose reception power falls within a wide range.

Moreover, the receiving apparatus having the foregoing arrangement switches between the normal operation mode and the low power consumption mode as required. Therefore, the reception standby states can be switched as follows: the low power consumption mode is selected when the power level of the received signal is high, and the normal operation mode is selected when the power level of the received signal is low. This makes it possible to realize a receiving apparatus which reduces power consumption of a communication apparatus and which can receive a signal whose reception power falls within a wide range of reception power.

Further, in addition to the foregoing arrangement, the receiving apparatus of the present invention receives a spread spectrum signal, and is preferably arranged such that: in the normal operation mode, the correlation detection section despreads the spread spectrum signal, and detects the correlation between (i) the despread spread spectrum signal and (ii) the predetermined reference signal; and the shift to the reception state is made when the correlation detected by the correlation detection section has a value not less than a certain value.

According to the foregoing arrangement, since the signal is received by using a direct-sequence spread spectrum technique, the signal can be received under little influence of electromagnetic noise.

Further, in addition to the foregoing arrangement, the receiving apparatus is preferably arranged such that: the normal operation mode and the low power consumption mode are switched between each other in accordance with the power level of the received signal, which power level is detected by the received signal level determination section.

According to the foregoing arrangement, for example, the normal operation mode and the low power consumption mode can be switched automatically as follows: the normal operation mode in which the receiving apparatus can receive a signal whose reception power falls within a wide range is selected when the power level of the received signal is low, and the low power consumption mode is selected when the power level of the received signal is high. That is, the user does not need to carry out a mode switching operation with respect to the receiving apparatus.

Further, in addition to the foregoing arrangement, the receiving apparatus of the present invention is connected to a terminal apparatus, and is preferably arranged so as to further include: a register section for storing a command concerning the reception standby states, which command is given from the terminal apparatus, wherein: the normal operation mode and the low power consumption mode are switched between each other with reference to the command stored in the register section.

According to the foregoing arrangement, the control of switching between the normal operation mode and the low power consumption mode can be carried out in accordance with the command given from the terminal apparatus. Therefore, the user can switch modes between the normal operation mode and the low power consumption mode by operating the terminal apparatus.

Further, in addition to the foregoing arrangement, the receiving apparatus is preferably arranged so as to further include: a standby mode selection section for selecting a reception standby state from the reception standby states, wherein: while the reception standby state is the normal operation mode, the received signal level determination section compares (i) the detected power level of the received signal with (ii) a certain threshold value A at which the received signal is detectable also in the low power consumption mode; and when the power level, detected by the received signal level determination section, of the received signal is not less than the threshold value A, the standby mode selection section carries out control such that the normal operation mode is switched to the low power consumption mode.

According to the foregoing arrangement, in the normal operation mode, the standby mode selection section switches the normal operation mode to the low power consumption mode when the received signal power level detected by the received signal level determination section is not less than the threshold value A. The threshold value A is a certain power level at which the received signal is detectable also in the low power consumption mode. Therefore, in a power range in which the signal can be received also in the low power consumption mode, the normal operation mode is switched to the low power consumption mode. This makes it possible to save power effectively.

Further, in addition to the foregoing arrangement, the receiving apparatus of the present invention is preferably arranged so as to further include: a success counter for counting a number of times a beacon signal is successfully received; and a standby mode selection section for selecting a reception standby state from the reception standby states, wherein: while the reception standby state is the normal operation mode, the received signal level determination section compares (i) the detected power level of the received signal with (ii) a certain threshold value A at which the received signal is detectable also in the low power consumption mode; and when the power level, detected by the received signal determination section, of the received signal is not less than the threshold value A, the success counter counts the number of times the beacon signal is successfully received; and when the number of times the beacon signal is successfully received reaches a certain value, the standby mode selection section carries out control such that the normal operation mode is switched to the low power consumption mode.

According to the foregoing arrangement, while the reception standby state is the normal operation mode, the standby mode selection section switches the normal operation mode to the low power consumption mode when the received signal power level detected by the received signal level determination section is not less than the threshold value A and when the number of times the beacon signal is successfully received reaches a certain value. Therefore, only in a power range in which the received signal can surely be received even in the low power consumption mode, the normal operation mode is switched to the low power consumption mode. This makes it possible to securely receive the signal.

Further, in addition to the foregoing arrangement, the receiving apparatus of the present invention is preferably arranged such that: while the reception standby state is the low power consumption mode, the received signal level determination section compares (i) the detected power level of the received signal with (ii) a certain threshold value B at which the received signal is not detectable in the low power consumption mode; and when the power level, detected by the received signal level determination section, of the received signal is not more than the threshold value B, the standby mode selection section carries out control such that the low power consumption mode is switched to the normal operation mode.

According to the foregoing arrangement, in the low power consumption mode, the standby mode selection section switches the low power consumption mode to the normal operation mode when the received signal power level detected by the received signal level determination section is not more than the threshold value B. Therefore, in a range of power of a signal that cannot be received in the low power consumption mode, the low power consumption mode is switched to the normal operation mode. This makes it possible to securely receive the signal.

Further, in addition to the foregoing arrangement, the receiving apparatus of the present invention is preferably arranged so as to further include: a timer section for detecting a time at which the beacon signal is picked up and received, wherein: the received signal level determination section compares the power level of the received signal with the threshold value B only when the beacon signal is received.

According to the foregoing arrangement, the received signal power level and the threshold value B are compared with each other only when a signal is actually received from a transmitting apparatus. Therefore, the received signal level determination section does not need to determine a power level of a signal (e.g., noise signal) other than the signal transmitted from the transmitting apparatus. This makes it possible to save power that is to be wasted by the received signal level determination section.

Further, in addition to the foregoing arrangement, the receiving apparatus of the present invention is preferably arranged such that: the threshold value A is greater than the threshold value B.

According to the foregoing arrangement, since the threshold value A and the threshold value B are different from each other, the receiving apparatus is less likely to be influenced by noise contained in the received signal.

Further, in addition to the foregoing arrangement, the receiving apparatus of the present invention is preferably arranged so as to further include: a power supply and clock control section for carrying out control such that power and a clock signal are supplied to a circuit provided in the receiving apparatus, wherein: during a reception standby operation, the power supply and clock control section carries out control such that the power and the clock signal are stopped from being supplied to a circuit other than a circuit carrying out the reception standby operation; and upon receiving a control signal indicating a start of reception, the power supply and clock control section carries out control such that the power and the clock signal are supplied to a circuit necessary for the reception. Further, the receiving apparatus of the present invention is preferably arranged such that: the control signal indicating the start of the reception is supplied from the received signal level determination section while the reception standby operation is carried out in the low power consumption mode.

According to the foregoing arrangement, during the reception standby operation, the power and the clock signal are stopped from being supplied to the circuit other than the circuit carrying out the reception standby operation. Therefore, the power consumption can be further reduced.

Further, a receiving apparatus of the present invention receives an external signal, and switches between reception standby states, the reception standby states, including: a normal operation mode in which a shift to a reception state is determined by (a) detecting a power level of a received signal and (b) detecting a correlation between the received signal and a predetermined reference signal; and a low power consumption mode in which the correlation between the received signal and the predetermined reference signal is not detected and in which the shift to the reception state is determined only by detecting a received signal power level not less than a predetermined value, the receiving apparatus carrying out a reception standby operation in the normal operation mode in a first reception power range in which reception is supposed to be possible but in which the reception is impossible in the low power consumption mode, the receiving apparatus carrying out the reception standby operation in the low power consumption mode in a second reception power range covering reception power higher than reception power covered by the first reception power range.

Further, the receiving apparatus of the present invention is arranged such that: the low power consumption mode and the normal operation mode are switched between each other in accordance with either (i) the power level of the received signal or (ii) an external switching operation.

According to the foregoing arrangement, the power consumption of the communication apparatus can be reduced, but the range of reception power of the signal that can be received is not narrowed.

Further, in order to attain the foregoing object, a communication apparatus of the present invention includes the foregoing receiving apparatus and a transmitting apparatus.

Further, in order to attain the foregoing object, a terminal apparatus of the present invention is a terminal apparatus which is connected to the foregoing receiving apparatus, the terminal apparatus, including: an operation section for (i) selecting a mode, as a reception standby state of the receiving apparatus, from (a) the normal operation mode, (b) the low power consumption mode, and (c) an automatic selection mode in which the normal operation mode and the low power consumption mode are switched between each other in accordance with a power level of a received signal, and (ii) allowing inputting of the selected mode into the receiving apparatus.

Further, a communication terminal apparatus of the present invention includes: either the foregoing receiving apparatus or the foregoing communication apparatus; and the foregoing terminal apparatus. For example, the communication apparatus is a wireless LAN apparatus; and the terminal apparatus is a terminal to which the wireless LAN apparatus is externally connected or which contains the wireless LAN apparatus. With this arrangement, the power consumption of the wireless LAN can be reduced.

Further, a receiving method of the present invention is a receiving method for receiving an external signal, the receiving method including a switching step of switching between reception standby states as required, the reception standby states, including: a normal operation mode in which a shift to a reception state is determined by (a) detecting a power level of a received signal and (b) detecting a correlation between the received signal and a predetermined reference signal; and a low power consumption mode in which the correlation between the received signal and the predetermined reference signal is not detected and in which the shift to the reception state is determined only by detecting a received signal power level not less than a predetermined value.

Further, in addition to the foregoing arrangement, the receiving method of the present invention is preferably arranged such that: in the switching step, the normal operation mode and the low power consumption mode are switched between each other in accordance with the power level of the received signal.

Further, in addition to the foregoing arrangement, the receiving method of the present invention is arranged such that: in the switching step, the normal operation mode is selected in a first reception power range in which reception is supposed to be possible but in which the reception is impossible in the low power consumption mode, and the low power consumption mode is selected in a second reception power range covering reception power higher than reception power covered by the first reception power range.

According to the foregoing method, the normal operation mode can be set in the "range in which the reception is supposed to be possible but in which the reception is impossible in the low power consumption mode", i.e., in the reception power range having a received signal level at which the signal cannot be received in the low power consumption mode. With this, the power consumption can be reduced, but the range of reception power of a signal that can be received by the receiving apparatus is not narrowed.

Further, a receiving program of the present invention is a computer program for causing. a computer to carry out the step.

With the foregoing arrangement, the receiving method or the receiving apparatus can be realized by carrying out the step by using the computer.

Further, a computer-readable recording medium storing the receiving program of the present invention is a computer-readable recording medium storing the receiving program which operates the receiving apparatus by causing the computer to carry out the step.

According to the foregoing arrangement, the receiving program read out from the recording medium makes it possible to realize the receiving method or the receiving apparatus on a computer.

BRIEF DESCRIPTION OF DRAWINGS

FIG. 2 is a diagram showing how inputs from a user interface are respectively correlated to standby modes.

BEST MODE FOR CARRYING OUT THE INVENTION

In this specification, a reception standby state refers to a state in which neither transmission nor reception is carried out, and includes two modes. One of the modes is a low power consumption mode, and the other mode is a normal operation mode.

The low power consumption mode refers to a mode in which a received signal is not demodulated and in which a shift to a reception state is determined only by detecting a reception power level signal with the use of a received signal level determination section.

The normal operation mode refers to an operation mode in which the shift to the reception state is determined in accordance with a value of a correlation between the received signal and a predetermined reference signal. (For example, the correlation value refers to amplitude or strength.)

Further, an automatic selection mode refers to a mode in which a mode is automatically selected from the normal operation mode and the low power consumption mode in accordance with reception power.

Figure 7:
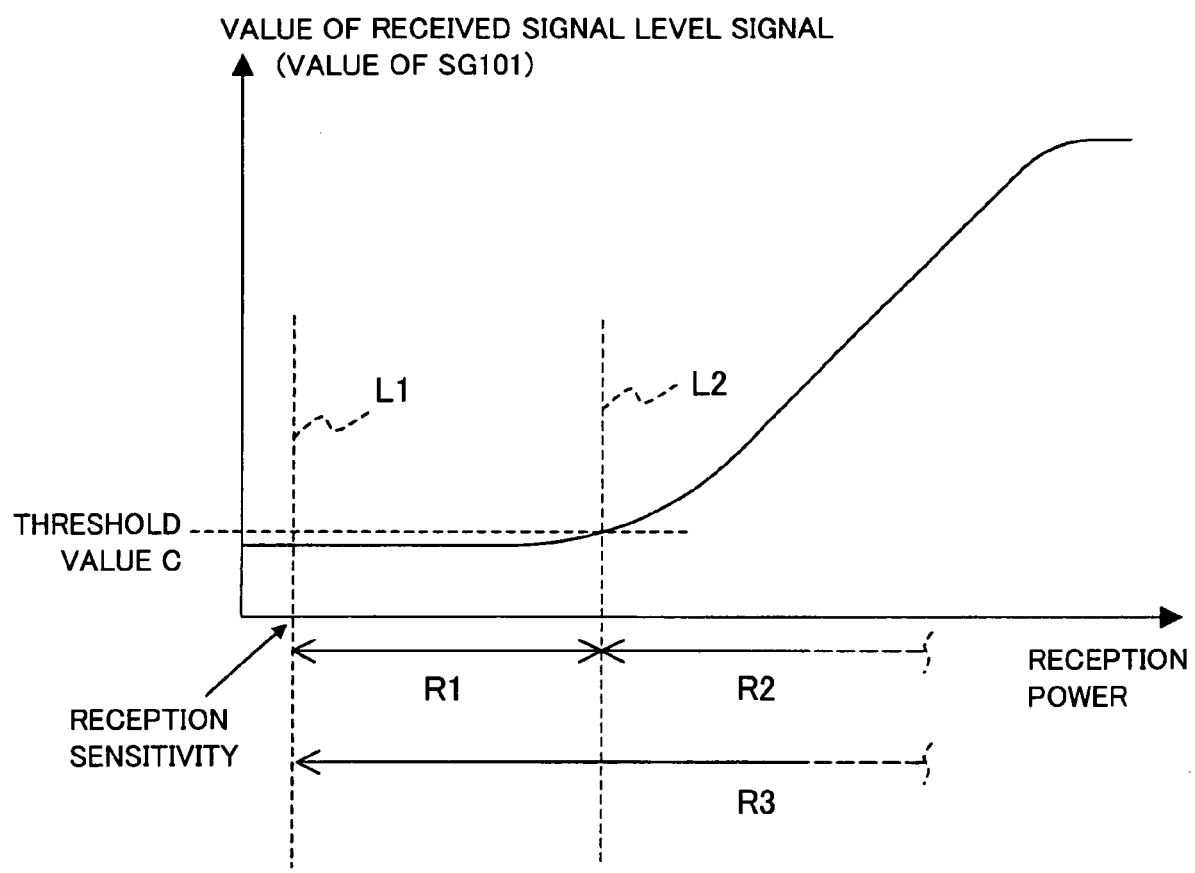
FIG. 7 shows a characteristic of a wireless apparatus, the horizontal axis representing reception power available at an end of an antenna, the vertical axis representing a value of a received signal level signal such as an RSSI.

A communication technique according to the present invention allows a terminal to autonomously switch between the normal operation mode and the low power consumption mode. For example, as described above, the standby operation is carried out in the normal operation mode in the first range R1 in which the reception is supposed to be possible but in which the reception is impossible in the low power consumption mode, and the standby operation is carried out in the low power consumption mode in the second range R2 (right to the dotted line L2 in FIG. 7) in which the reception power is higher than in the first range. Thus, the communication technique allows the terminal to keep a communication range which the terminal is designed to have, and allows reduction of as much unnecessary power consumption as possible.

That is, a communication apparatus according to the present invention, a direct-sequence spread spectrum communication apparatus in particular, is capable of demodulating even a signal having a level equivalent to a noise level. Therefore, the range R1 shown in FIG. 7 appears in which the reception is supposed be possible but in which the reception is impossible in the low power consumption mode. The feature of the communication apparatus according to the present invention lies in that the standby operation is carried out in the normal operation mode when the reception power falls within the range R1. With this, the reception of the signal can be carried out even when the reception power falls within the range R1.

Figure 1:
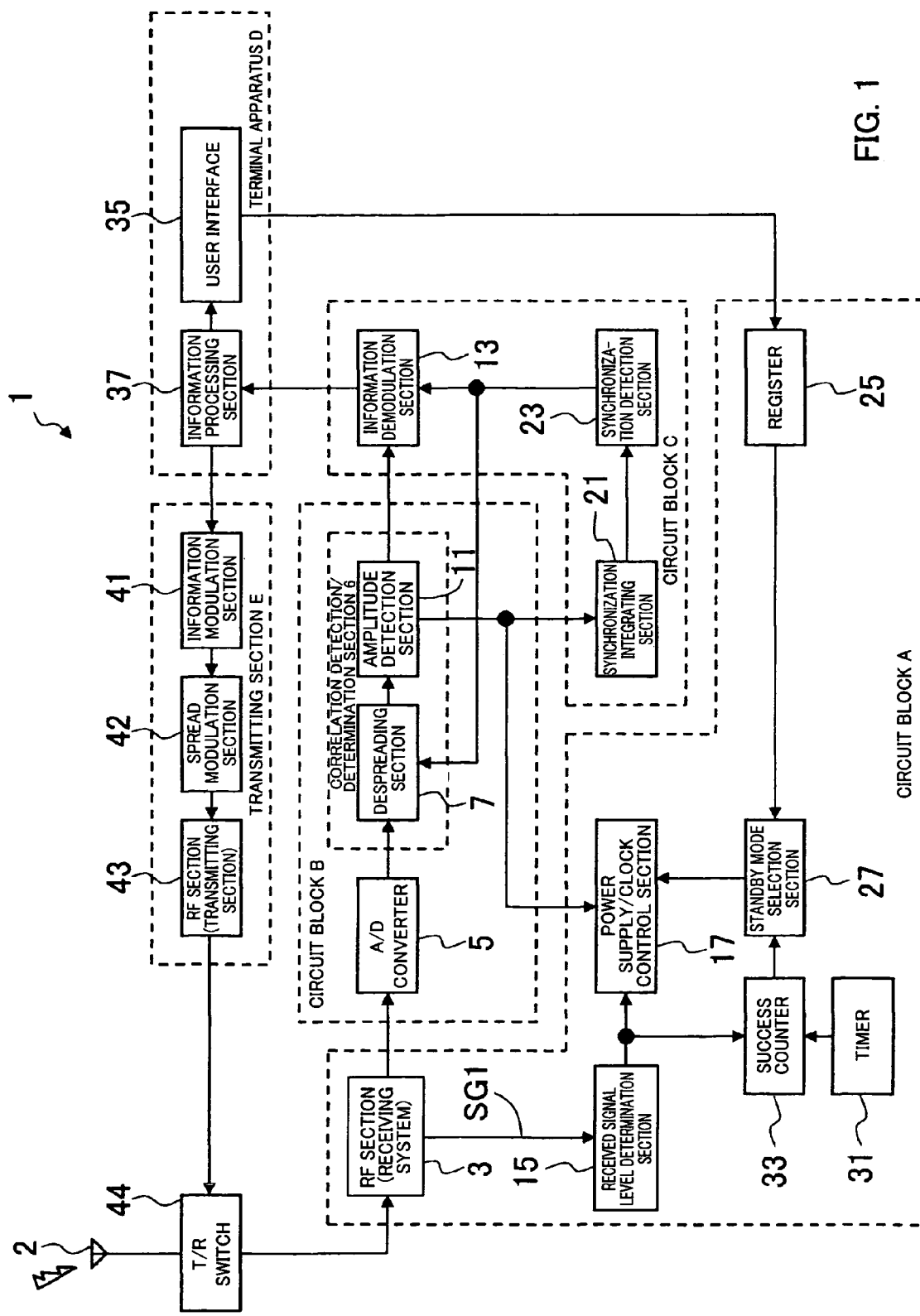
FIG. 1 is a functional block diagram showing an example of an arrangement of a communication apparatus according to Embodiment 1 of the present invention. Embodiment 2 will also be described with reference to FIG. 1.
Figure 5:
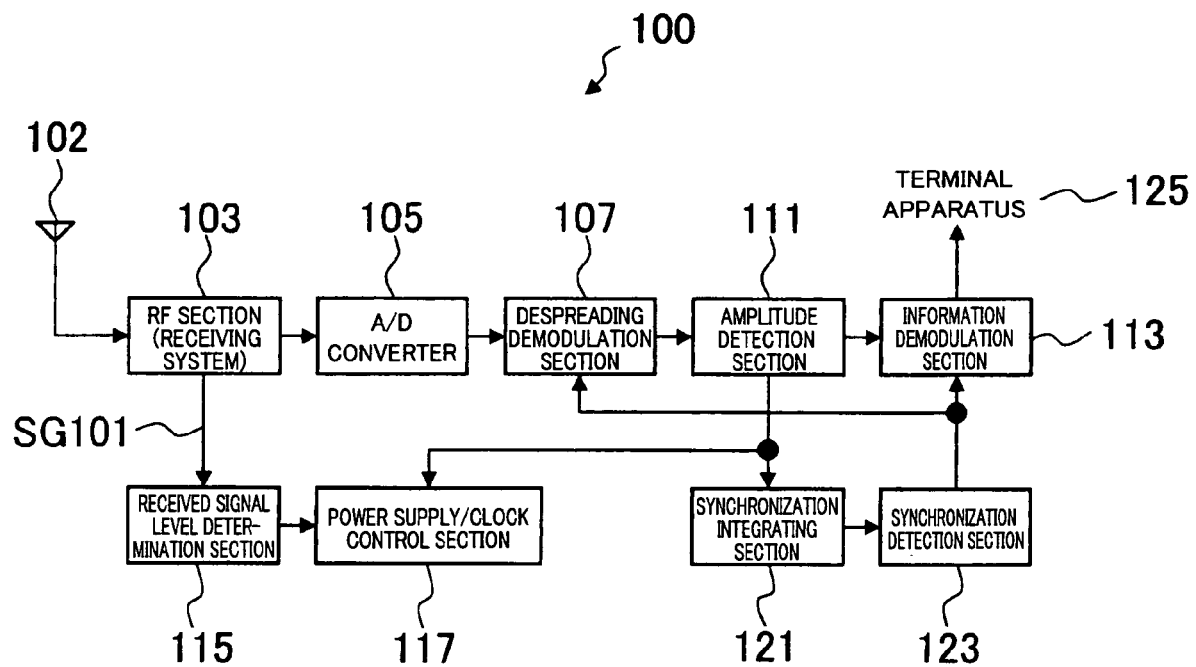
FIG. 5 is a functional block diagram showing an example of an arrangement of each of a transmitting section and a receiving section of a conventional wireless LAN system adopting a direct-sequence spread spectrum technique.

In the following, a communication apparatus according to one embodiment of the present invention will be described with reference to the drawings. FIG. 1 is a functional block diagram showing an example of an arrangement of the communication apparatus according to the present embodiment. The communication apparatus shown in FIG. 1 is arranged in basically the same manner as is the apparatus shown in FIG. 5. The feature of the communication apparatus lies in a receiving system of the communication apparatus. Therefore, an arrangement of a transmitting system of the communication apparatus is simply described.

As shown in FIG. 1, a wireless communication apparatus (communication apparatus) 1 according to the present embodiment includes: an antenna 2; a T/R switch 44; a transmitting section (transmitting apparatus) E; and a receiving section (receiving apparatus), which includes a circuit block A, a circuit block B, and a circuit block C. The wireless communication apparatus 1 is connectable to a terminal apparatus D. A specific example of the wireless communication apparatus 1 is a wireless LAN card, and a specific example of the terminal apparatus D is a personal computer (hereinafter referred to as "PC") having an interface (e.g., PC card slot) into which the wireless LAN card is inserted. Alternatively, the terminal apparatus D may be a PC having a wireless LAN function of the wireless communication apparatus 1. Furthermore, the wireless communication apparatus 1 and the terminal apparatus D constitute a communication terminal apparatus.

As shown in FIG. 1, the circuit block A includes an RF section (receiving system) 3, a received signal level determination section 15, a power supply/clock control section 17, a success counter 33, a standby mode selection section 27, a timer (timer section) 31, and a register (register section) 25. The circuit block A mainly carries out (i) detection of a received signal level signal and (ii) control of the circuit blocks A to C. Further, the circuit block A is a circuit that always operates regardless of the modes. The circuit block B includes an A/D converter 5, a despreading section 7, and an amplitude detection section 11. The despreading section 7 and the amplitude detection section 11 constitute a correlation detection/determination section (correlation detection section) 6. The circuit block B operates in the normal operation mode. For example, the circuit block B despreads a received signal, in the spread spectrum method. The circuit block C includes an information demodulation section 13, a synchronization integrating section 21, and a synchronization detection section 23. The circuit block C carries out demodulation of the received signal. The terminal apparatus D includes a user interface (operation section) 35 and an information processing section 37. The transmitting section E includes an information modulation section 41, a spread modulation section 42, and an RF section (transmitting end) 43. In the following, the transmitting section E will not be explained.

The RF section (receiving system) 3 receives an electric wave from the antenna 2 via the T/R switch 44, which switches between (i) a signal path for transmitting a signal and (ii) a signal path for receiving a signal. Then, the RF section (receiving system) 3 extracts, from the electric wave, a signal falling within a necessary signal band, and carries out frequency conversion of the signal into a baseband signal. Furthermore, the RF section (receiving system) 3 includes a circuit for generating a signal having a value substantially proportional to the reception power (such a signal being hereinafter referred to as "received signal level signal" (indicating a received signal power level)). The baseband signal is sent to the A/D converter 5, and the A/D converter 5 converts the baseband signal into a digital signal, with the result that the received signal thus converted into the digital signal is spectrum-spread. Therefore, the despreading section 7 despreads the received signal by multiplying a spread code. The amplitude detection section 11 has a function of calculating an amplitude value, i.e., a correlation value with the reverse spread signal. When the amplitude value is at a certain level or higher, it is judged that the wireless communication terminal 1 has received a packet. Then, a synchronization process is started.

Explained here is how the correlation detection/determination section 6 calculates the value of the correlation between the received signal and a predetermined reference signal. This will be described below with reference to FIG. 8.

Figure 8:
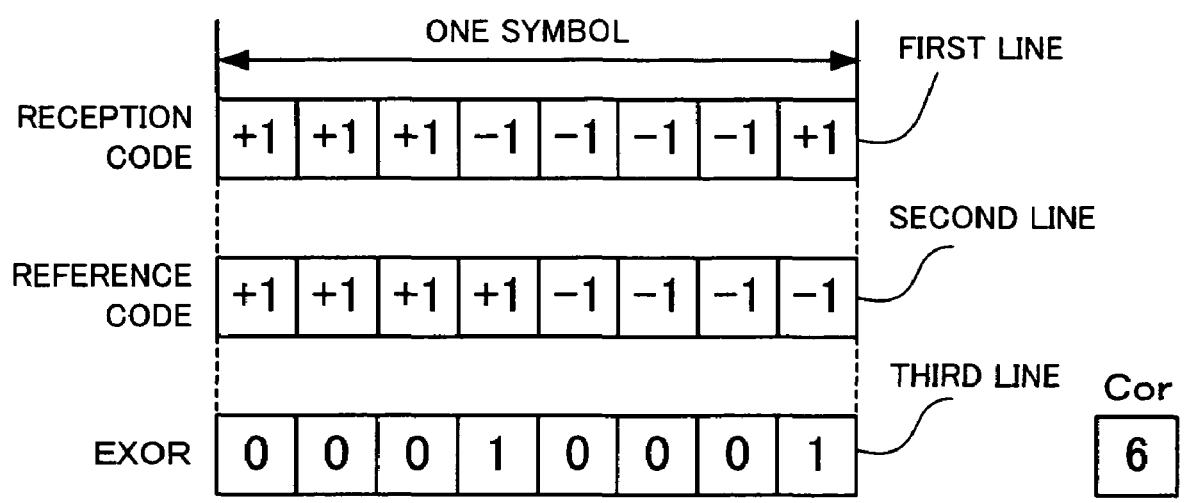
FIG. 8 is a diagram showing an example of how a value of a correlation associated with a received signal is calculated.

The first line (upper column) of FIG. 8 represents a reception code contained in the received signal. The reception code has eight chips for one symbol, and the eight chips are referred and are compared with the reference signal. A numerical value (+1) is rendered to a chip in which the received signal has an amplitude level higher than a threshold value (i.e., an amplitude level at which it can be judged, in consideration of a noise level, that the received signal has been received). On the other hand, a numerical value (−1) is rendered to a chip in which the received signal has an amplitude level lower than the threshold value.

The second line (middle column) of FIG. 8 represents a reference code contained in the reference signal available in the correlation detection/determination section 6. A group of four chips each representing an amplitude level (+1) higher than the threshold value and a group of four chips each representing an amplitude level (−1) lower than the threshold value are arranged to repeatedly come one after the other. In the example shown in FIG. 8, the reference code has a code length of eight chips.

The third line (lower column) indicates an exclusive logical sum (EXOR) of the reception code and the reference code. The exclusive logical sum is found per chip. In cases where the reception code and the reference code match each other, the exclusive logical sum is "0". In cases where the reception code and the reference code do not match each other, the exclusive logical sum is "1". The correlation value Cor is acquired as the number (total number) of "0"s contained in one code. (The correlation value is "6" in the example shown in FIG. 8.) That is, when the correlation value is a certain value (e.g., the correlation value is "6") or higher, the received signal can be deemed to have a correlation with the reference signal, and therefore is judged to be an effective signal.

In order to eliminate the influence of noise, the synchronization integrating section 21 integrates, per symbol, the correlation value obtained by the amplitude detection section 11.

The synchronization detection section 23 specifies a correlation peak position in accordance with an output of the synchronization integrating section 21 so as to obtain a synchronization signal synchronized with the symbol. The synchronization signal thus obtained is used, for example, for (i) symbol demodulation to be carried out by the information demodulation section 13 and (ii) determination of timing of the correlation value multiplication to be carried out by the despreading demodulation section 7. The information demodulation section 13 demodulates the symbol in accordance with the output of the amplitude detection section 11 and the output (synchronization signal) of the synchronization detection section 23. The information thus demodulated is sent to the terminal apparatus D, and then is appropriately processed as information data or management data.

The received signal level determination section 15 compares (i) a value of a received signal level signal (whose typical example is the RSSI generated at an intermediate frequency signal stage) SG1 with (ii) a preset threshold value. In the present embodiment, the value of the received signal level signal is compared with a threshold value A (see FIG. 6) in the normal operation mode, and the value of the received signal level signal is compared with a threshold value B (see FIG. 6) in the low power consumption mode.

During the reception standby, the power supply/clock control section 17 stops power and a clock signal from being supplied to circuit blocks other than the circuit block that operates during the reception standby. When receiving a control signal indicating the start of the reception operation, the power supply/clock control section 17 allows the power and the clock signal to be supplied to a block necessary for the reception operation. The control signal indicating the start of the reception operation is obtained from the amplitude detection section 11 in the normal operation mode, and is obtained from the received signal level determination section 15 in the low power consumption mode.

The information processing section 37 provided in the terminal apparatus D appropriately processes, as the information data or the management data, the information obtained from the information demodulation section 13, and sends the management data to the user interface 35. The user carries out inputting into the user interface 35 so as to select a standby mode. There are three types of standby mode: the normal operation mode, the low power consumption mode, and the automatic selection mode. The automatic selection mode is a mode in which either one of the normal operation mode and the low power consumption-mode is automatically selected in accordance with the reception power. Via the user interface 35, the user specifies (gives an instruction as to) a standby mode in which the wireless circuit 1 carries out the standby operation. Information concerning the mode thus selected and specified by the user through the user interface 35 is written in the register 25, and the standby mode selection section 27 operates in the standby mode in accordance with the information thus written. That is, the register 25 temporarily retains the instruction given from the terminal apparatus D, and retains the standby mode until the standby mode is changed due to the next operation of the user interface 35. The standby mode selection section 27 has a function of actually selecting the standby mode by making reference to, when the wireless circuit 1 carries out the standby operation, the mode stored in the register 25. In some cases, the register does not need to be used. However, in practice, the timing at which the wireless circuit 1 operates is often out of synchronization with the timing at which the instruction is given at the terminal apparatus D. Therefore, it is preferable that the instruction be given through the register 25. In this way, the instruction as to the standby modes is given from the user interface 35 of the terminal apparatus D.

From the user's perspective, there are three types of standby mode: (i) the normal operation mode in which the circuit block A and the circuit block B are operated, (ii) the low power consumption mode in which only the circuit block A is operated, and (iii) the automatic selection mode. In the reception state, the circuit blocks A to C are operated. On the other hand, in terms of the operation of the wireless communication apparatus 1, there are only two types of standby mode: (a) the normal operation mode and (b) the low power consumption mode. In cases where the automatic selection mode is specified, the standby mode selection section 27 selects either one of the two standby modes by following the procedure.

In the low power consumption mode, the success counter 33 judges whether the reception operation (reception state) has started at a timing which is obtained, for example, from the timer 31 and at which a beacon signal is supposed to be received. In cases where the success counter 33 judges that the reception operation has not started, the success counter 33 notifies the standby mode selection section 27 that the reception has failed. Then, the standby mode selection section 27 switches to the normal operation mode. On the other hand, in the normal operation mode, in cases where the success counter 33 judges that the reception operation has started at the timing which is obtained from the timer 31 and at which the beacon signal is supposed to be received, the success counter 33 counts the number of times a signal indicating that "the received signal level exceeds the threshold value A" is obtained from the received signal level determination section 15. In cases where the signal is obtained consecutively for more than N times (N being a predetermined value), i.e., in cases where the count value exceeds N, the success counter 33 notifies the standby mode selection section 27 that the reception has succeeded. With this, the standby mode selection section 27 switches the mode from the normal operation mode to the low power consumption mode. The timer 31 indicates, to the success counter 33, the timing at which the beacon signal is supposed to be received.

FIG. 2 is a diagram showing how inputs from the user interface 35 are respectively correlated to the standby modes, each of which is selected by the standby mode selection section 27. As shown in FIG. 2, in cases where the user interface 35 receives an input indicating "NORMAL STANDBY", the standby mode selection section 27 selects the normal operation mode. In cases where the user interface 35 receives an input indicating "LOW POWER CONSUMPTION STANDBY", the standby mode selection section 27 selects the low power consumption mode. In cases where the user interface 35 receives an input indicating "AUTOMATIC SELECTION", the standby mode selection section 27 automatically selects either one of the normal operation mode and the low power consumption mode. As shown in FIG. 2, from the user's perspective, it is possible to select a mode from the three modes: "NORMAL STANDBY", "LOW POWER CONSUMPTION STANDBY", and "AUTOMATIC SELECTION". However, in practice, the wireless communication apparatus 1 carries out the standby operation in accordance with a mode selected from the two modes: the normal operation mode and the low power consumption mode.

Figure 6:
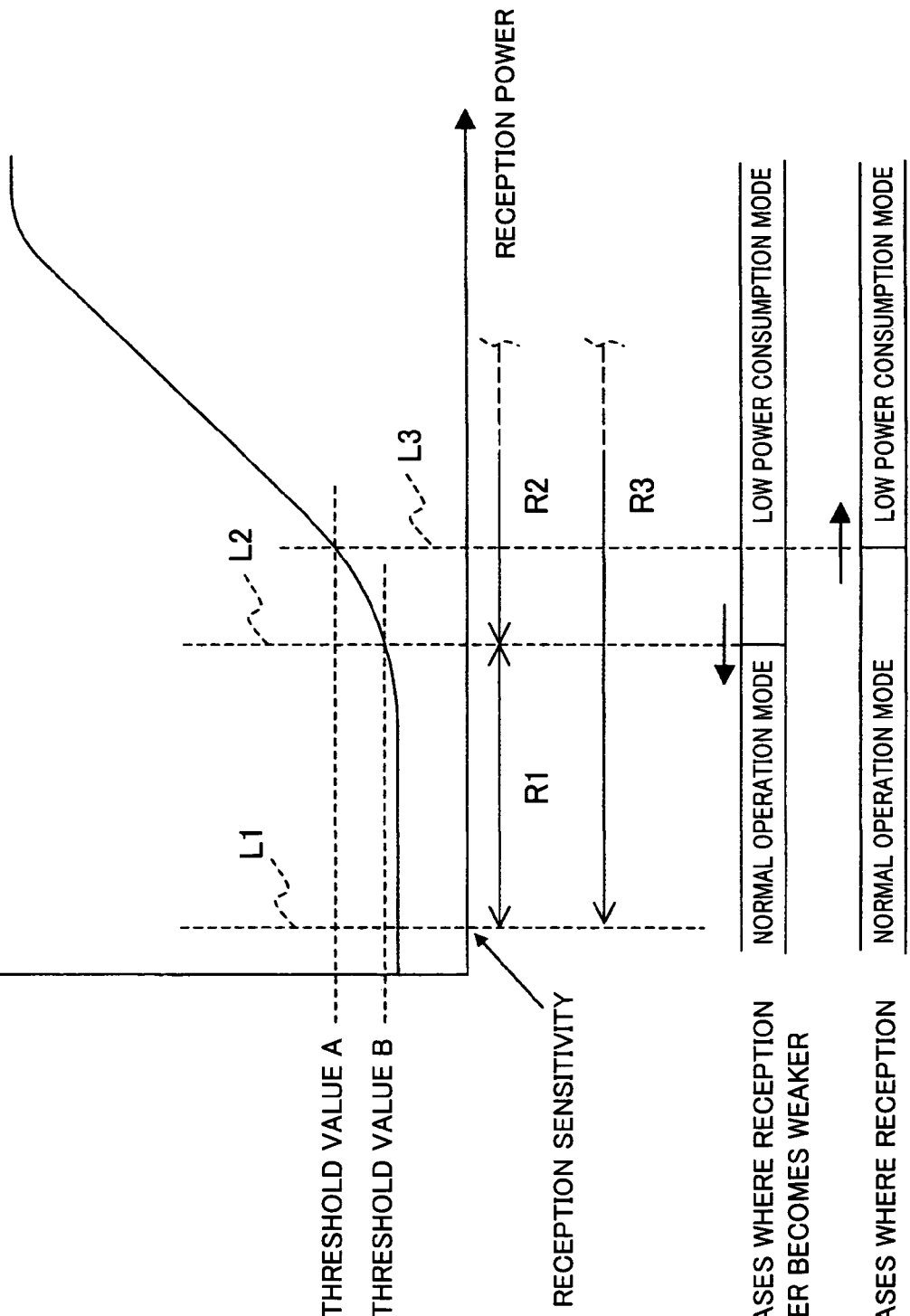
FIG. 6 is a diagram showing how the standby modes are selected in the automatic selection process in relation to a threshold value A and a threshold value B.

The following explains the threshold values with reference to FIG. 6. The characteristic graph, the symbols L1 and L2, and the symbols R1 to R3, each of which is shown in FIG. 6, have the same meanings as those shown in FIG. 7, respectively. Further, the threshold value B is identical to the threshold value C shown in FIG. 7. The respective meanings of the threshold values A and B are as follows.

First, the threshold value A will be described. Assume that the wireless terminal is carrying out the standby operation in the normal operation mode. The normal operation mode is switched to the low power consumption mode in cases where the value of the received signal level signal obtained when the packet has been received at such a timing that the packet is supposed to be received exceeds the threshold value A consecutively for N times or more, i.e., in cases where the reception power exceeds a value indicated by the dotted line L3. The symbol (b) shown in a lower part of FIG. 6 represents how the standby modes are switched at the threshold value A. Specifically, as indicated by the rightward arrow in the symbol (b) of FIG. 6, the normal operation mode is switched to the low power consumption mode, for example, in such a case that: the reception power gradually becomes stronger as the wireless terminal and a transmitting terminal, which were so far way from each other that the communication was barely possible, come closer to each other.

Then, the threshold value B will be described. Assume that the wireless terminal is carrying out the standby operation in the low power consumption mode. The low power consumption mode is switched to the normal operation mode in cases where the reception operation has not started although the wireless terminal has received the packet and where the received signal level falls short of the threshold value B, i.e., in cases where the reception power falls short of a value indicated by the dotted line L2. The symbol (a) shown in the lower part of FIG. 6 represents how the standby modes are switched at the threshold value B. Specifically, as indicated by the leftward arrow of the symbol (a) of FIG. 6, the low power consumption mode is switched to the normal operation mode, for example., in such a case that: the reception power gradually becomes weaker as the wireless terminal and the transmitting terminal, which were close to each other enough to communicate with each other, go away from each other.

The threshold values A and B may be equal to each other. However, generally, it is preferable that the threshold values A and B should not be equal to each other. The reason is as follows: the received signal contains noise, and when there is only one threshold value serving as a criterion, the operation becomes unstable due to the influence of the noise.

Figure 3:
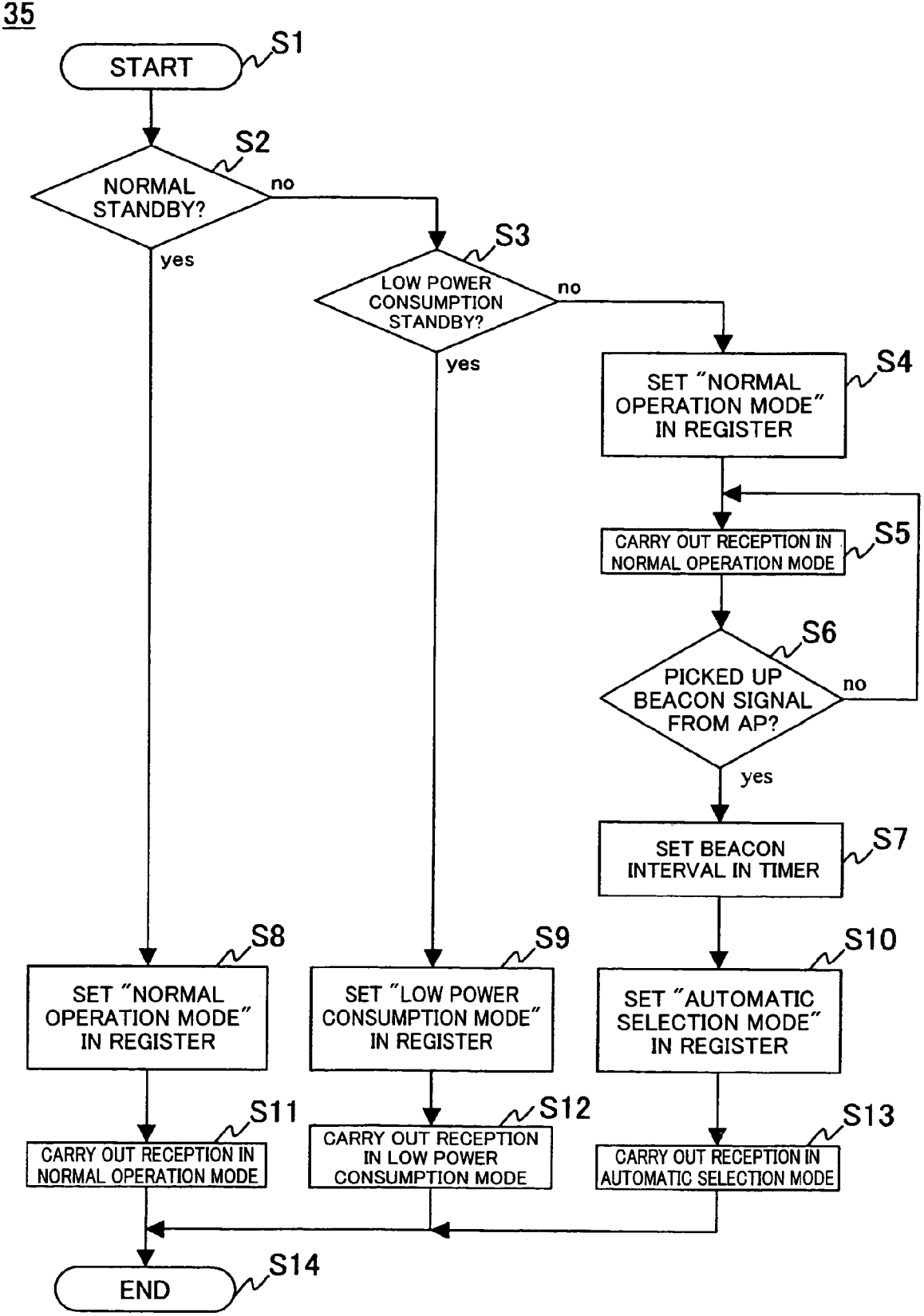
FIG. 3 is a flow chart showing a flow of a mode selection process of selecting between modes of the communication apparatus according to the present embodiment.
Figure 4:
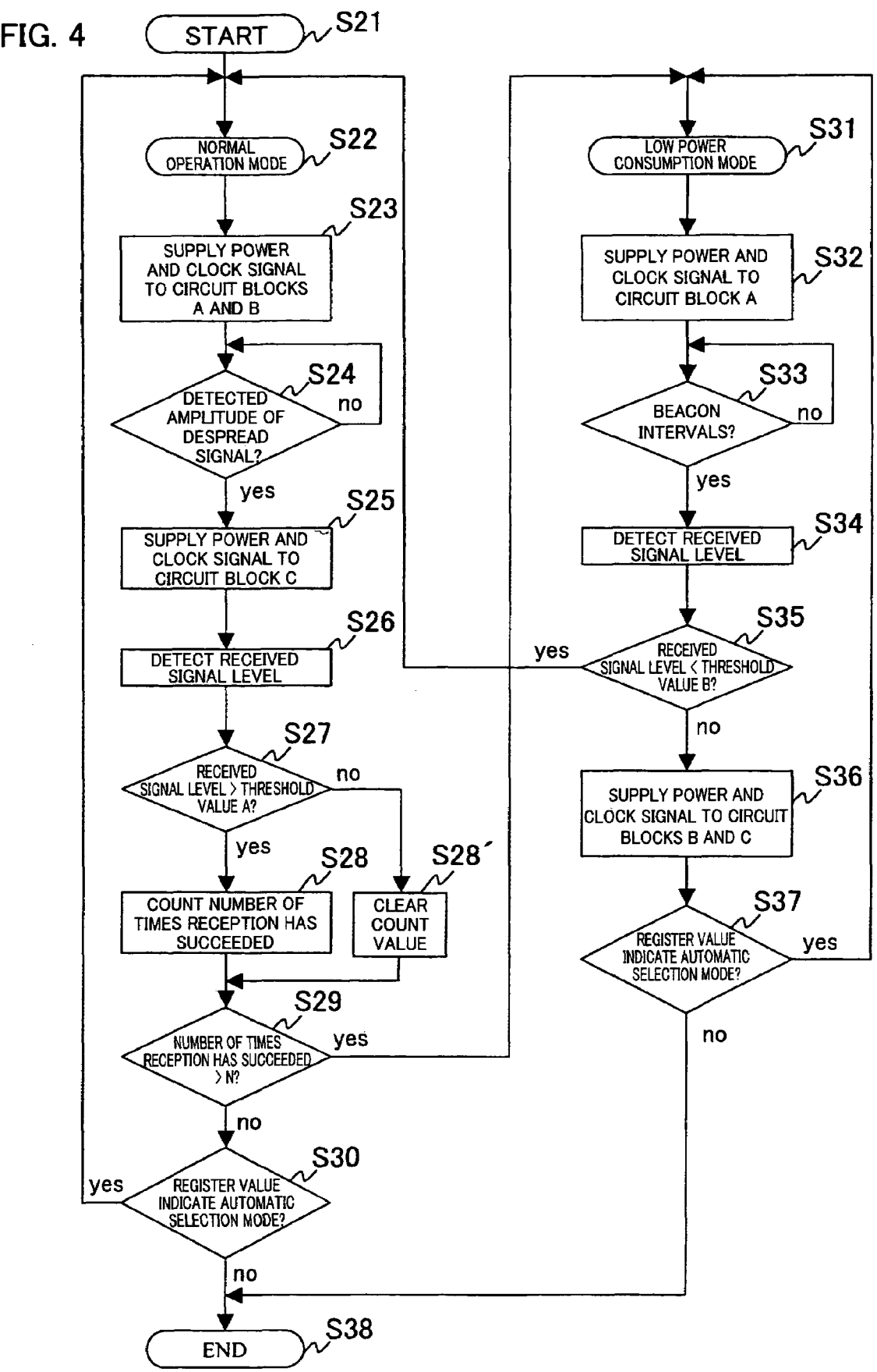
FIG. 4 is a flow chart showing a flow of an automatic selection process (automatic switching process) of selecting between a normal operation mode and a low power consumption mode.

The following explains an actual mode selection operation with reference to FIG. 3. FIG. 3 is a flow chart showing a flow of a mode selection process using the user interface 35 of the communication apparatus according to the present embodiment. First, as shown in FIG. 3., the process is started in Step S1. Then, in Step S2, it is judged whether or not the user interface 35 has received the input indicating "NORMAL STANDBY". In cases where the user interface 35 has received the input indicating "NORMAL STANDBY" (YES), the process proceeds to Step S8, and the information concerning the normal operation mode is set in the register. Then, in Step S11, the reception operation is carried out in the normal operation mode. On the other hand, in cases where it is judged in Step S2 that the user interface 35 has not received the input indicating "NORMAL STANDBY", it is judged whether or not the user interface 35 has received an input indicating "LOW POWER CONSUMPTION STANDBY". In cases where the user interface 35 has received the input indication "LOW POWER CONSUMPTION STANDBY" (YES), the process proceeds to Step S9, and the information concerning the low power consumption mode is set in the register. Then, in Step S12, the reception operation is carried out in the low power consumption mode. On the other hand, in cases where it is judged in Step S3 that the user interface 35 has not received the input indicating "LOW POWER CONSUMPTION STANDBY", the process proceeds to Step S4, and the information concerning the normal operation mode is set in the register. Then, the process proceeds to Step S5, and the reception operation is carried out in the normal operation mode. Then, the process proceeds to Step S6, and it is judged whether or not the beacon signal is received from an AP (access point). In cases where the beacon signal is not received (NO), the process returns to Step S5, and the communication apparatus waits until the beacon signal is received. When the beacon signal is received, the process proceeds to Step S7, and an interval of the reception of the beacon signal is set in the timer 31. Then, the process proceeds to Step S10, and the information concerning the automatic selection mode is set in the register. Then, in Step S13, the reception operation is carried out in the automatic selection mode. In any of the above cases, the process proceeds to Step S14 when the reception process is to be finished.

With reference to FIGS. 1 through 4, the following explains an automatic selection process (automatic switching process) of selecting (switching between) either one of the normal operation mode and the low power consumption mode. First, the process is started in Step S21. Then, the normal operation mode is set in Step S22. Thereafter, in Step S23, the power supply/clock control section 17 allows the power and the clock signal to be supplied to the circuit block A and the circuit block B. In Step S24, the correlation detection/determination section 6 judges whether or not there is a correlation value with the amplitude of the despread signal (a noise has no correlation value). In cases where the correlation is detected (YES), the process proceeds to Step S25, and the power supply/clock control section 17 allows the power and the clock signal to be supplied to the circuit block C. In cases where no correlation is detected, the detection process (Step S24) is repeated until a correlation is detected.

In Step S26, the received signal level determination section 15 carries out detection of the received signal level signal. In cases where it is judged in Step S27 that the detected received signal level signal indicates a received signal level not less than the threshold value A shown in FIG. 6 (YES), the process proceeds to Step S28, and the success counter 33 counts the number of times the reception has succeeded. In cases where the received signal level is less than the threshold value A, the process proceeds from Step S27 to Step S28', and the count value is cleared. Then, the process proceeds to Step S29. In Step 29, the success counter 33 judges whether or not the number of times the reception has succeeded is not less than N. When it is judged in Step S29 that the number of times the reception has succeeded is not less than N (YES), it means that the received signal level has exceeded the threshold value A consecutively for N times. Therefore, the process proceeds to Step 31, so that the normal operation mode is switched to the low power consumption mode. In cases where the number of times the reception has succeeded is less than N, the process proceeds to Step S30, and the standby mode selection section 27 makes reference to the register 25 so as to judge whether or not the register 25 has a register value indicating the automatic selection mode. In cases where it is judged in Step S30 that the register 25 has the register value indicating the automatic selection mode (YES), the process returns to Step S22, and the normal operation mode is continued. In cases where the register 25 does not have the register value indicating the automatic selection mode, the process proceeds to Step S38, and the process is terminated.

The following explains operations to be carried out by the wireless communication apparatus 1 in respective steps of the low power consumption mode starting from Step S31.

In Step S32, the power supply/clock control section 17 allows the power and the clock signal to be supplied to the circuit block A. Then, in Step S33, the timer 31 monitors the time of arrival of the beacon signal sent periodically from the transmitting apparatus with which the wireless communication apparatus 1 communicates. Then, the process proceeds to Step S34 at the time of arrival of the beacon signal. On the other hand, while the wireless communication apparatus 1 does not receive the beacon signal, i.e., until the time of arrival of the beacon signal, Step S33 is continued. Therefore, the other operations, such as the correlation detection, are not carried out by the circuit block B and the circuit block C.

In Step 34, at the time of arrival of the beacon signal, the received signal level determination section 15 detects a received signal level signal corresponding to the beacon signal.

Then, in Step S35, the received signal level determination section 15 judges whether or not the received signal level signal corresponding to the beacon signal has a value not more than the threshold value B. In cases where the received signal level is not more than the threshold value B (YES), the standby mode selection section 27 judges it impossible to demodulate the received signal in the low power consumption mode. Then, the process proceeds to Step S22, and the low power consumption mode is switched to the normal operation mode. On the other hand, in cases where the received signal level signal has a value greater than the threshold value B (NO), the standby mode selection section 27 judges it possible to demodulate the received signal in the low power consumption mode. Then, the process proceeds to Step S36.

In Step S36, the power supply/clock control section 17 allows the power and the clock signal to be supplied to the circuit block B and the circuit block C, with the result that the reception state is started. Then, the process proceeds to Step S37, and the standby mode selection section 27 makes reference to the register 25 so as to judge whether or not the register 25 has a register value indicating the automatic selection mode. In cases where it is judged in Step S37 that the register 25 has the register value indicating the automatic selection mode (YES), the process returns to Step S31. In cases where the register 25 does not have the register value indicating the automatic selection mode, the process proceeds to Step S38, and the process is terminated.

As described above, the low power consumption mode is switched to the normal operation mode in cases where the detected received signal level signal has a value not more than the threshold value B. On the other hand, the normal operation mode is switched to the low power consumption mode in cases where the detected received signal level signal has a value not less than the threshold value A and where the number of times the beacon signal has been successfully received is not less than the predetermined value. As such, the normal operation mode is securely set in the "range (R1) in which the reception is supposed to be possible but in which the reception is impossible in the low power consumption mode". This allows for actual reception.

The following explains a communication apparatus according to Embodiment 2 of the present invention. The feature of the communication apparatus according to the present embodiment lies in that: the user of the terminal operates the user interface of the terminal so as to select in which standby mode the communication apparatus carries out the standby operation, i.e., so as to switch between the normal operation mode and the low power consumption mode. FIG. 1 is a block diagram showing an example of an arrangement of the communication apparatus according to Embodiment 1 of the present invention, and the communication apparatus according to the present embodiment differs from the communication apparatus according to Embodiment 1 in that the communication apparatus according to the present embodiment does not have the timer 31, the success counter 33, and the standby mode selection 27.

The feature of the communication apparatus according to the present embodiment lies in that: the normal operation mode and low power consumption mode are switched in accordance with the user's operation of the user interface 35. That is, in the process of FIG. 3, the user switches between the normal operation mode and the low power consumption at his/her own judgment made in accordance with a received signal level or the like. For example, the user carries out an operation in accordance with a detected received signal level so as to select either one of the normal operation mode and the low power consumption operation, and information concerning the mode selected in accordance with the operation is stored in the register. The user appropriately switches between the modes in accordance with the detected value or the like. With this, the same effect can be obtained as in Embodiment 1. Furthermore, the communication apparatus according to the present embodiment has an advantage of being simplified as compared with Embodiment 1.

As described above, according to the communication apparatus according to each of the embodiments of the present invention, the automatic selection mode is provided such that: the low power consumption mode is switched to the normal operation mode in cases where the detected received signal level is not more than the threshold value B; and the normal operation mode is switched to the low power consumption mode in cases where the detected received signal level is not less than the threshold value A and where the number of times the beacon signal has been successfully received is not less than the predetermined value. The normal operation mode is set in the "range (R1) in which the reception is supposed to be possible but in which the reception is impossible in the low power consumption mode", i.e., in the reception power range (R1) having a received signal level at which an electric wave cannot be picked up in the low power consumption mode. This brings about an advantage of reducing the power consumption of the communication apparatus without narrowing the range of the reception power of the signal that can be received by the communication apparatus.

The present invention is not limited to the description of the embodiments above, but may be altered by a skilled person within the scope of the claims. An embodiment based on a proper combination of technical means disclosed in different embodiments is encompassed in the technical scope of the present invention.

Operating means such as a CPU executes a program stored in storage means such as a ROM (read only memory) and a RAM (random access memory) so as to control input means (e.g., a keyboard), output means (e.g., a display), or communication means (e.g., an interface circuit). In this way, the members and processes of the wireless communication apparatus 1 of the foregoing embodiment are achieved and executed. Therefore, the foregoing various functions and processes can be achieved by simply causing a computer having these means to read and execute the program stored in a storage medium. Further, by storing the program in a removable storage medium, the various functions and processes can be achieved on any computer.

Such a computer program storage medium may be a memory (not shown), such as a ROM, so that the process is executable on a microcomputer. Alternatively, a program medium may be used which can be read by inserting the storage medium in an external storage device (program reader device; not shown).

In addition, in either of the cases, it is preferable if the contained program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if a system can be constructed which can connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

As described above, in an aspect of the present invention, there is provided a receiving apparatus including: a received signal level determination section for detecting a power level of a received signal; and a correlation detection section for detecting a correlation associated with the received signal, the receiving apparatus switching between reception standby states, the reception standby states, including: a normal operation mode in which a shift to a reception state is determined in accordance with whether or not the correlation is detected by the correlation detection section; and a low power consumption mode in which the shift to the reception state is determined in accordance with whether or not a received signal power level is detected by the received signal level determination section. The receiving apparatus is preferably arranged so as to use a direct-sequence spread spectrum technique, wherein: in the normal operation mode, the correlation detection section despreads a spread spectrum signal, and detects the correlation associated with the despread spread spectrum signal; and the shift to the reception state is made when the correlation detected by the correlation detection section has a value not less than a certain value. Furthermore, the receiving apparatus is arranged so as to have an automatic selection mode in which the normal operation mode and the low power consumption mode are switched between each other in accordance with (a) the power level of the received signal, which power level is detected by the reception determination section and (b) success or failure of demodulation of a beacon signal periodically emitted.

The automatic selection mode allows the normal operation mode to be set in the "range in which reception is supposed be possible but in which the reception is impossible in the low power consumption mode", i.e., in the reception power range having a received signal level at which an electric wave cannot be received in the low power consumption mode. Thus, the range of reception power of a signal that can be received is not narrowed.

Furthermore, the receiving apparatus of the present invention is arranged so as to further include: a register section for storing a command concerning the reception standby states, which command is given from a terminal apparatus connected to the receiving apparatus. The receiving apparatus of the present invention is arranged so as to further include: a standby mode selection section for selecting a standby mode from the normal operation mode, the low power consumption mode, and the automatic selection mode with reference to an operation mode stored in the register. The storage of the command in the register enables the standby mode selection section to carry out control with reference to an operation mode selected most recently.

The receiving apparatus includes: a success counter for counting a number of times a beacon signal is successfully received; and a standby mode selection section for (i) selecting a reception standby state from the reception standby states of the receiving apparatus and (ii) controlling power and a clock signal to be supplied to a circuit provided in the receiving apparatus, wherein: when the normal operation mode is selected in the automatic selection mode and when the received signal level is not less than a certain threshold value A at which the received signal is detectable also in the low power consumption mode, the reception determination section judges that the reception has succeeded; and when the number of times counted by the successful reception section reaches a certain number of times, the standby mode selection section carries out control such that the normal operation mode is switched to the low power consumption mode.

Further, the receiving apparatus is arranged such that: when the low power consumption mode is selected in the automatic selection section and when the received signal power level is not more than a threshold value B which is a received signal level lower than the threshold value A and at which the received signal is not detectable in the low power consumption mode, the reception determination section judges that the reception has failed; and the standby mode selection section carries out control such that the low power consumption mode is switched to the normal operation mode.

Further, the receiving apparatus is arranged so as to further include: a timer section for detecting a time at which the beacon signal is picked up and received, wherein: the reception determination section compares the power level of the received signal with the threshold value B only when the beacon signal is received, so as to determine whether or not the low power consumption mode is able to be continued.

The automatic selection mode is provided such that: the low power consumption mode is switched to the normal operation mode when the received signal level of the detected signal is not more than the threshold value B; and the normal operation mode is switched to the low power consumption mode when the received signal level of the detected signal is not less than the threshold value A and when the number of times the beacon signal is successfully received is not less than a predetermined value. This ensures that the normal operation mode is set in the "range in which the reception is supposed be possible but in which the reception is impossible in the low power consumption mode", i.e., in the reception power range having a received signal level at which the electric wave cannot be picked up in the low power consumption mode. With this, the power consumption of the communication apparatus can be reduced, but the range of the reception power of the signal that can be received is not narrowed.

Further, the receiving apparatus is arranged so as to further include: a power supply and clock control section for carrying out control such that power and a clock signal are supplied to a circuit provided in the receiving apparatus, wherein: during a reception standby operation, the power supply and clock control section carries out control such that the power and the clock signal are stopped from being supplied to a circuit other than a circuit carrying out the reception standby operation; and upon receiving a control signal indicating a start of reception, the power supply and clock control section carries out control such that the power and the clock signal are supplied to a circuit necessary for the reception. The receiving apparatus is arranged such that: the control signal indicating the start of the reception is supplied from the received signal level determination section while the reception standby operation is carried out in the low power consumption mode.

A receiving apparatus of the present invention switches between reception standby states, the reception standby states, including: (i) a normal operation mode in which a shift to a reception state is determined by (a) detecting a level of a received signal and (b) detecting a correlation associated with the received signal; and (ii) a low power consumption mode in which the correlation associated with the received signal is not detected and in which the shift to the reception state is determined only by detecting the power level of the received signal, the receiving apparatus carrying out a reception standby operation in the normal operation mode in a first reception power range in which reception is supposed to be possible but in which the reception is impossible in the low power consumption mode, the receiving apparatus carrying out the reception standby operation in the low power consumption mode in a second reception power range covering reception power higher than reception power covered by the first reception power range.

The receiving apparatus is arranged such that: the low power consumption mode and the normal operation mode are switched between each other either (i) automatically or (ii) in accordance with a switching operation carried out by using a terminal apparatus which gives a command to the receiving apparatus. Note that a communication apparatus may be constituted which includes the foregoing receiving apparatus and a transmitting apparatus.

There is provided a terminal apparatus including an input section which allows an operation of (i) selecting a mode, as a reception standby mode of the receiving apparatus, from (a) a normal operation mode in which a shift to a reception state is determined by detecting a level of a received signal and detecting a correlation associated with the received signal, (b) a low power consumption mode in which the correlation associated with the received signal is not detected and in which the shift to the reception state is determined only by detecting a received signal power level, and (c) an automatic selection mode in which either one of the normal operation mode and the low power consumption mode is automatically selected, and (ii) allowing inputting of the selected mode.

A wireless communication apparatus may be constituted which includes the foregoing receiving apparatus or communication apparatus and the foregoing terminal apparatus. For example, the wireless communication apparatus is arranged such that: the communication apparatus is a wireless LAN apparatus; and the terminal apparatus is a terminal to which the wireless LAN apparatus is externally connected or which contains the wireless LAN apparatus. With this arrangement, the power consumption of the wireless LAN can be reduced.

In another aspect of the present invention, there is provided: (i) a receiving method including the step of carrying out a reception standby operation in either (a) a normal operation mode in which a shift to a reception state is determined in accordance with whether or not a correlation associated with a received signal is detected, or (b) a low power consumption mode in which the shift to the reception state is determined in accordance with whether or not a received signal power level is detected; or (ii) a program for causing a computer to carry out the step.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be applied to a wireless LAN, various communication apparatuses, and an apparatus provided with a communication apparatus. Examples of the communication apparatuses include a mobile terminal, a mobile phone, a PHS phone, and a PHS card.

The invention claimed is:

1. A receiving apparatus, comprising (i) a received signal level determination section for detecting a power level of a received signal; and (ii) a correlation detection section for detecting a correlation between the received signal and a predetermined reference signal,
the receiving apparatus switching between reception standby states as required,
said reception standby states, including:
a normal operation mode in which a shift to a reception state is determined in accordance with whether or not the correlation is detected by the correlation detection section; and
a low power consumption mode in which the shift to the reception state is determined in accordance with whether or not a received signal power level not less than a predetermined value is detected by the received signal level determination section, wherein:
the normal operation mode and the low power consumption mode are switched between each other in accordance with the power level of the received signal, which power level is detected by the received signal level determination section.

2. The receiving apparatus as set forth in claim 1, receiving a spread spectrum signal,
wherein:
in the normal operation mode, the correlation detection section despreads the spread spectrum signal, and detects the correlation between (i) the despread spread spectrum signal and (ii) the predetermined reference signal; and
the shift to the reception state is made when the correlation detected by the correlation detection section has a value not less than a certain value.

3. The receiving apparatus as set forth in claim 1, being connected to a terminal apparatus,
the receiving apparatus, further comprising:
a register section for storing a command concerning the reception standby states, which command is given from the terminal apparatus,
wherein:
the normal operation mode and the low power consumption mode are switched between each other with reference to the command stored in the register section.

4. The receiving apparatus as set forth in claim 1, further comprising:
a standby mode selection section for selecting a reception standby state from the reception standby states,
wherein:
while the reception standby state is the normal operation mode, the received signal level determination section compares (i) the detected power level of the received signal with (ii) a certain threshold value A at which the received signal is detectable also in the low power consumption mode; and
when the power level, detected by the received signal level determination section, of the received signal is not less than the threshold value A, the standby mode selection section carries out control such that the normal operation mode is switched to the low power consumption mode.

5. The receiving apparatus as set forth in claim 4, wherein:
while the reception standby state is the low power consumption mode, the received signal level determination section compares (i) the detected power level of the received signal with (ii) a certain threshold value B at which the received signal is not detectable in the low power consumption mode; and
when the power level, detected by the received signal level determination section, of the received signal is not more than the threshold value B, the standby mode selection section carries out control such that the low power consumption mode is switched to the normal operation mode.

6. The receiving apparatus as set forth in claim 5, further comprising:
a timer section for detecting a time at which a beacon signal is picked up and received,
wherein:
the received signal level determination section compares the power level of the received signal with the threshold value B only when the beacon signal is received.

7. The receiving apparatus as set forth in claim 5, wherein: the threshold value A is greater than the threshold value B.

8. The receiving apparatus as set forth in claim 1, further comprising:
- a success counter for counting a number of times a beacon signal is successfully received; and
- a standby mode selection section for selecting a reception standby state from the reception standby states, wherein:

while the reception standby state is the normal operation mode, the received signal level determination section compares (i) the detected power level of the received signal with (ii) a certain threshold value A at which the received signal is detectable also in the low power consumption mode; and when the power level, detected by the received signal determination section, of the received signal is not less than the threshold value A, the success counter counts the number of times the beacon signal is successfully received; and when the number of times the beacon signal is successfully received reaches a certain value, the standby mode selection section carries out control such that the normal operation mode is switched to the low power consumption mode.

9. The receiving apparatus as set forth in claim 1, further comprising:
- a power supply and clock control section for carrying out control such that power and a clock signal are supplied to a circuit provided in the receiving apparatus, wherein:

during a reception standby operation, the power supply and clock control section carries out control such that the power and the clock signal are stopped from being supplied to a circuit other than a circuit carrying out the reception standby operation; and upon receiving a control signal indicating a start of reception, the power supply and clock control section carries out control such that the power and the clock signal are supplied to a circuit necessary for the reception.

10. The receiving apparatus as set forth in claim 9, wherein:
the control signal indicating the start of the reception is supplied from the received signal level determination section while the reception standby operation is carried out in the low power consumption mode.

11. A communication apparatus, comprising:
the receiving apparatus as set forth in claim 1; and
a transmitting apparatus.

12. A terminal apparatus, which is connected to the receiving apparatus as set forth in claim 1,
the terminal apparatus, comprising:
an operation section for (i) selecting a mode, as a reception standby state of the receiving apparatus, from (a) the normal operation mode, (b) the low power consumption mode, and (c) an automatic selection mode in which the normal operation mode and the low power consumption mode are switched between each other in accordance with a power level of a received signal, and (ii) allowing inputting of the selected mode into the receiving apparatus.

13. The receiving apparatus comprising:
a machine-readable medium having instructions stored thereon, such that when the instructions are read and executed by a processor, the processor is configured to function as the receiving apparatus according to claim 1.

14. A communication terminal apparatus, comprising:
a communication apparatus including the receiving apparatus as set forth in claim 1 and a transmitting apparatus; and a terminal apparatus connected to the receiving apparatus, the terminal apparatus including an operation section for (i) selecting a mode, as a reception standby state of the receiving apparatus, from (a) the normal operation mode, (b) the low power consumption mode, and (c) an automatic selection mode in which the normal operation mode and the low power consumption mode are switched between each other in accordance with a power level of a received signal, and (ii) allowing inputting of the selected mode into the receiving apparatus.

15. The communication terminal apparatus as set forth in claim 14, wherein:
the communication apparatus is a wireless LAN apparatus; and
the terminal apparatus is a terminal to which the wireless LAN apparatus is externally connected or which contains the wireless LAN apparatus.

16. A receiving apparatus for receiving an external signal,
the receiving apparatus switching between reception standby states,
said reception standby states, including:
a normal operation mode in which a shift to a reception state is determined by (a) detecting a power level of a received signal and (b) detecting a correlation between the received signal and a predetermined reference signal; and
a low power consumption mode in which the correlation between the received signal and the predetermined reference signal is not detected and in which the shift to the reception state is determined only by detecting a received signal power level not less than a predetermined value,
the receiving apparatus carrying out a reception standby operation in the normal operation mode in a first reception power range in which reception is supposed to be possible but in which the reception is impossible in the low power consumption mode, the receiving apparatus carrying out the reception standby operation in the low power consumption mode in a second reception power range covering reception power higher than reception power covered by the first reception power range.

17. The receiving apparatus as set forth in claim 16, wherein:
the low power consumption mode and the normal operation mode are switched between each other in accordance with either (i) the power level of the received signal or (ii) an external switching operation.

18. The receiving apparatus comprising:
a machine-readable medium having instructions stored thereon, such that when the instructions are read and executed by a processor, the processor is configured to function as the receiving apparatus according to claim 16.

19. A receiving method for receiving an external signal,
the receiving method, comprising a switching step of switching between reception standby states as required,
said reception standby states, including:
a normal operation mode in which a shift to a reception state is determined by (a) detecting a power level of a received signal and (b) detecting a correlation between the received signal and a predetermined reference signal; and
a low power consumption mode in which the correlation between the received signal and the predetermined reference signal is not detected and in which the shift to the reception state is determined only by detecting a received signal power level not less than a predetermined value.

20. The receiving method as set forth in claim 19, wherein:
in the switching step, the normal operation mode and the low power consumption mode are switched between each other in accordance with the power level of the received signal.

21. The receiving method as set forth in claim 19, wherein:
in the switching step, the normal operation mode is selected in a first reception power range in which reception is supposed to be possible but in which the reception is impossible in the low power consumption mode, and the low power consumption mode is selected in a second reception power range covering reception power higher than reception power covered by the first reception power range.

22. A computer readable medium storing a program, such that when the program is read or executed by a processor, the processor is configured to carry out the step as set forth in claim 19.

23. A receiving apparatus, comprising for receiving an external signal,
the receiving apparatus switching between reception standby states,
said reception standby states, including:
a normal operation mode in which a shift to a reception state is determined by (a) detecting a power level of a received signal and (b) detecting a correlation between the received signal and a predetermined reference signal; and
a low power consumption mode in which the correlation between the received signal and the predetermined reference signal is not detected and in which the shift to the reception state is determined only by detecting a received signal power level not less than a predetermined value.

24. The receiving apparatus as set forth in claim 23, wherein:
the normal operation mode and the low power consumption mode are switched between each other in accordance with the power level of the received signal.

25. The receiving apparatus as set forth in claim 23, wherein:
the normal operation mode is selected in a first reception power range in which reception is supposed to be possible but in which the reception is impossible in the low power consumption mode, and the low power consumption mode is selected in a second reception power range covering reception power higher than reception power covered by the first reception power range.

26. The receiving apparatus comprising:
a machine-readable medium having instructions stored thereon, such that when the instructions are read and executed by a processor, the processor is configured to function as the receiving apparatus according to claim 23.

* * * * *